(12) United States Patent
Barton et al.

(10) Patent No.: US 10,931,463 B2
(45) Date of Patent: Feb. 23, 2021

(54) CRYPTOGRAPHIC VERIFICATION OF A COMPRESSED ARCHIVE

(71) Applicant: MICROSOFT TECHNOLOGY LICENSING, LLC., Redmond, CA (US)

(72) Inventors: Jeremy Scott Barton, Seattle, WA (US); Morgan Asher Brown, Redmond, WA (US); Levi Broderick, Redmond, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 183 days.

(21) Appl. No.: 15/863,907

(22) Filed: Jan. 6, 2018

(65) Prior Publication Data

US 2019/0149340 A1    May 16, 2019

Related U.S. Application Data

(60) Provisional application No. 62/585,754, filed on Nov. 14, 2017.

(51) Int. Cl.
    *G06F 21/00*    (2013.01)
    *H04L 9/32*     (2006.01)
    (Continued)

(52) U.S. Cl.
    CPC ........ *H04L 9/3263* (2013.01); *G06F 21/6209* (2013.01); *G06F 21/64* (2013.01);
    (Continued)

(58) Field of Classification Search
    CPC .......... G06F 21/10; G06F 21/16; G06F 21/44; G06F 21/60; G06F 21/602; G06F 21/604;
    (Continued)

(56) References Cited

U.S. PATENT DOCUMENTS

| | | | |
|---|---|---|---|
| 6,629,150 B1 * | 9/2003 | Huded | G06F 21/64 |
| | | | 707/999.004 |
| 7,533,268 B1 * | 5/2009 | Catorcini | H04L 9/3247 |
| | | | 713/168 |

(Continued)

FOREIGN PATENT DOCUMENTS

EP    1515445 A1    3/2005

OTHER PUBLICATIONS

"International Search Report and Written Opinion Issued in PCT Application No. PCT/US2018/059713", dated Jan. 7, 2019, 12 Pages.

*Primary Examiner* — Edward Zee (57) ABSTRACT

The authenticity of a compressed archive is verified without decompressing the files and/or directories contained therein and without impeding existing archive reader tools and utilities. A container is produced that includes a signature component and a compressed archive component. The signature component contains a digital signature of the compressed archive and the compressed archive component contains the compressed archive. The signature component and the compressed archive component are constructed as independent components so that existing software tools that operate on a compressed archive can still function in their normal course of operation.

16 Claims, 6 Drawing Sheets

(51) Int. Cl.
   *G06F 21/62*   (2013.01)
   *G06F 21/64*   (2013.01)
   *H04L 9/14*    (2006.01)
   *H04L 9/30*    (2006.01)
   *H04W 12/10*   (2021.01)

(52) U.S. Cl.
   CPC .............. *H04L 9/14* (2013.01); *H04L 9/30* (2013.01); *H04L 9/3247* (2013.01); *H04W 12/10* (2013.01)

(58) Field of Classification Search
   CPC ...... G06F 21/62; G06F 21/6209; G06F 21/64; G06F 21/645
   See application file for complete search history.

(56) References Cited

U.S. PATENT DOCUMENTS

| | | |
|---|---|---|
| 7,890,465 B2 | 2/2011 | Basin et al. |
| 7,895,434 B2 | 2/2011 | Peterson |
| 8,683,605 B1 | 3/2014 | Tenenboym et al. |
| 9,246,889 B2 | 1/2016 | Tsai et al. |
| 9,311,317 B1 | 4/2016 | Savant |
| 2005/0094817 A1 | 5/2005 | Peterson |
| 2007/0043779 A1 | 2/2007 | Basin et al. |
| 2007/0094508 A1* | 4/2007 | Palum .................. G06F 21/572 713/176 |
| 2009/0006860 A1* | 1/2009 | Ross .................... H04L 63/126 713/189 |
| 2009/0240952 A9 | 9/2009 | Peterson |
| 2010/0119070 A1 | 5/2010 | Peterson |
| 2013/0067587 A1* | 3/2013 | Leet .......................... G06F 7/00 726/26 |

\* cited by examiner

CRYPTOGRAPHIC VERIFICATION OF A COMPRESSED ARCHIVE

CROSS REFERENCE TO RELATED APPLICATIONS

The present application claims the benefit of U.S. Provisional Application No. 62/585,754 filed Nov. 14, 2017.

BACKGROUND

Data integrity pertains to the accuracy and authenticity of data. The data in a file may be corrupted when the file is stored, processed, and retrieved. Data files migrated from a storage device and/or transmitted between two sources may be corrupted due to transmission errors, software bugs, faulty storage devices, malicious attacks, human error, and the like. In order to ensure the integrity of the data, data verification techniques are used to ensure that the data is authentic and has not been compromised.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The authenticity of a compressed archive is cryptographically protected by generating a container that includes a signature data object and a compressed archive. The compressed archive is digitally signed and the resulting cryptographic signature is embedded into a signature data object that is included in the container along with the compressed archive. The signature data object is formatted in accordance with a desired cryptographic protocol, such as without limitation, Cryptographic Message Syntax (CMS), an Extensible Markup Language Digital signature (XMLDsig), CMS Authenticated Data, and the like. In one aspect, the signature data object may also include metadata that identifies the cryptographic signature technique used to produce the digital signature and an identifier that is associated with a digital certificate used to produce the cryptographic signature.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Overview

The subject matter disclosed herein pertains to a mechanism for verifying the authenticity of a compressed archive without decompressing the files and/or directories contained therein and without impeding existing archive reader tools and utilities. The mechanism configures a container that includes a signature component and a compressed archive component. The signature component contains a signature data object representing the digitally-signed compressed archive and the compressed archive component contains the compressed archive. The signature component and the compressed archive component are constructed as independent components so that existing software tools that operate on a compressed archive can still function in their normal course of operation.

A compressed archive is a collection of compressed files and/or directories and metadata. A file is compressed using a particular data encoding or compression technique that reduces the size of a file. There are various compression techniques such as, without limitation, Lempel-Ziv (LZ), Lempel-Ziv-Welch (LZW), Store, Deflate, DCL Implode. The compressed files may be aggregated into an archive in accordance with a particular archive format.

ZIP is well-known archive file format that adheres to the .ZIP File Format Specification, ISO/IEC 21320-1:2015. A ZIP archive includes one or more files and/or directories of files. The files and/or directories may be compressed and/or uncompressed. Each file is stored individually. Each file is compressed and decompressed separately so that a file can be extracted without decompressing the entire archive. Each file can be compressed using a different compression or encoding scheme.

A central directory is placed at the end of a ZIP file. The central directory identifies the location of each file in the archive. At the end of the ZIP archive is an end-of-central-directory record which identifies the compressed archive as a ZIP archive. The order of the files in the central directory does not coincide with the order of the files in the archive. Software tools or utilities that read a ZIP file scan for the central directory in order to access the files in the archive since the central directory maintains the location of the files in the archive. These tools do not scan from the top of the archive since only the central directory has the list of files in the archive and their location.

In one aspect, the compressed archive is digitally signed using a cryptographic signature technique. The signature value is then captured into a signature data object that is incorporated into the signature component of the container using a cryptographic protocol (e.g., CMS, XMLDsig, CMS Authenticated Data, etc.). The cryptographic protocol supports certain cryptographic signature techniques (e.g., Rivest-Shamir-Aldeman (RSA), Digital Signature Algorithm (DSA), Elliptic-Curve Digital Signature Algorithm (ECDSA) and Hash-based Message Authentication Code (HMAC), etc.). Cryptographic signature techniques frequently employ a cryptographic hashing technique (e.g., message digest algorithm, hash algorithm, etc.) such as Message Digest 5 (MD5), Secure Hash Algorithm 1 (SHA-1), Secure Hash Algorithm-2 (SHA-2), etc.

The signature component may also include an optional header that indicates that the container is digitally signed and which identifies the protocol used to format the signature value. The header is beneficial for those archive readers (i.e., software utilities or tools) to quickly scan the archive. The header is also advantageous for tools that validate signatures to know whether or not the container is signed.

The mechanism disclosed herein provides advantages over existing techniques that digitally sign ZIP files. The incorporation of the signature data object inside the container avoids the existence of "time to check to time of use" vulnerabilities. A "time to check to time of use" vulnerability introduces software bugs caused by changes in the system between the time a file is verified and the time the file is used. The time lag between the time the file is verified and the time when the file is used allows for signature misappropriations to occur. In addition, when the digital signature is detached from the file and the file is moved to a new location independent of the digital signature, the file may not be verifiable at the new location. These issues are avoided by embedding the signature data object in the same container as the compressed archive.

In addition, the mechanism described herein is beneficial since it maintains the ZIP file format for the compressed archive. This allows existing archive readers to access the ZIP archive without any impediments introduced by the signature data component.

Attention now turns to a further description of a system embodying these techniques.

Figure 1:
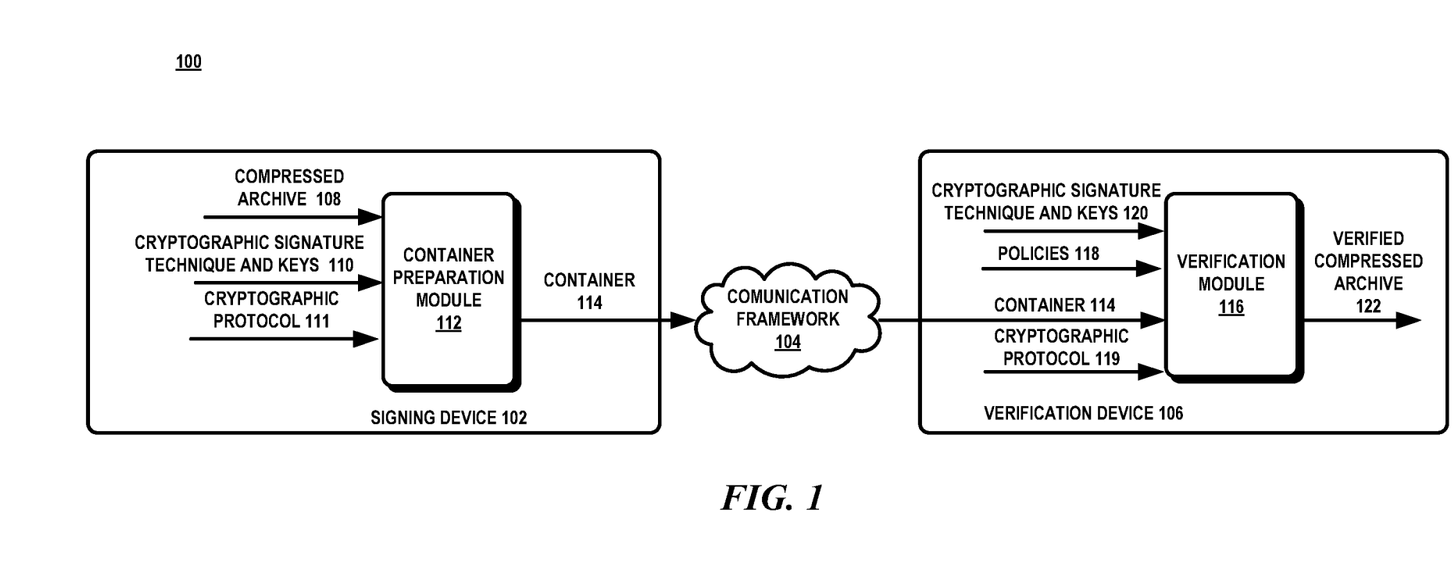
FIG. 1 illustrates an exemplary system for facilitating the verification of a compressed archive.

FIG. 1 illustrates a block diagram of an exemplary system 100 in which various aspects of the invention may be practiced. As shown in FIG. 1, the system 100 includes a signing device 102, a communications framework 104, and a receiving device 106. The signing device 102 is an electronic device that produces a container 114 including a signed compressed archive. The signing device 102 can be associated with a service, a user, a developer, or any entity having the capability to digitally sign a compressed archive. The verification device 106 is an electronic device that receives the container 114 having the signed compressed archive and which verifies the compressed archive. The communications framework 104 facilitates communications between the signing device 102 and the verifying device 106. The communications framework 104 can embody any type of communications medium, such as wired or wireless networks, utilizing any communication protocol. In one aspect, the communications framework 104 is the Internet utilizing well known Internet protocols that facilitate communications between the signing device 106 and the verification device 106.

The signing device 102 includes a container preparation module 112 having executable instructions that are configured to receive a compressed archive 108. The container preparation module 112 utilizes a cryptographic signature technique and keys 110, and a cryptographic protocol 111 to produce a container 114 including a signature component and a compressed archive component. In one aspect, the compressed archive 108 is a ZIP archive.

The verification device 106 includes a verification module 116 including executable instructions that are configured to determine whether or not a compressed archive is authentic. The verification module 106 makes this determination based on the container 114 received from the signing device 102 and one or more policies 118. The verification module 106 also utilizes a cryptographic signature technique and keys 120 and a cryptographic protocol 119.

The policies 118 are rules that determine if the signature is acceptable. For example, for a physical contract that utilizes a handwritten signature, a policy may indicate that only ink may be used and not pencil, crayon, blood, or other markings. A policy may indicate a particular color of the ink that is acceptable. A policy may indicate that the signature must use the same color ink throughout the document, that the signature is notarized, that is person signing the document has a specific title and affiliation with a party to the contract, and the like.

Exemplary policies for a digital signature may require a particular type of digital certificate used to digitally sign a file, that a cryptographic timestamp is used, and that the timestamp is within a particular time frame. A policy may also indicate conditions for the cryptographic signature technique with respect to the cryptographic timestamp. For example, a policy may indicate that for digital signature computed using Elliptic Curve Digital Signature Algorithm (e.g., ECDSA, FIPS 186-3), the key must utilize a named curve specified by the National Institute of Science and Technology (NIST) in a prime field of 256 or more bits (such as the NIST P-256, NIST P-384, or NIST P-521 curves) and that the signature must be computed using one of the Secure Hash Algorithms (SHA) (e.g., SHA-2 256-bit, SHA-2 384-bit, or SHA-2 512-bit) as the underlying cryptographic digest technique.

Figure 2:
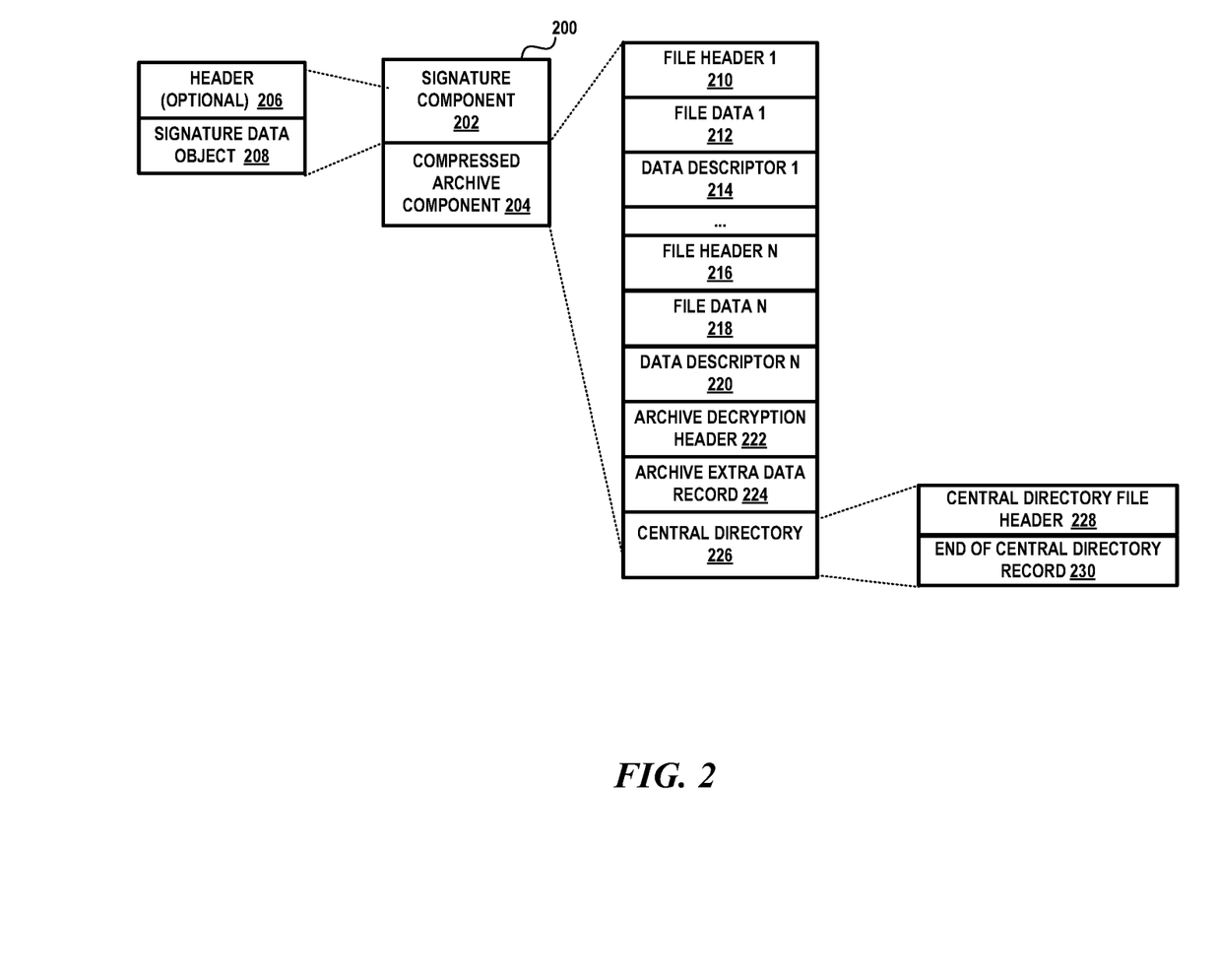
FIG. 2 is a block diagram illustrating an exemplary configuration of a container.

Turning to FIG. 2, there is shown an exemplary configuration of a container 200 for the signed compressed archive. The container 200 is composed of a signature component 202 and a compressed archive component 204. The signature component 202 includes a signature data object 208 and optionally, a header 206. The header 206 includes data that indicates whether or not the archive is digitally signed and the protocol associated with the signature value. This is useful for ZIP tools that read the container to quickly recognize that the container is signed.

In one aspect, the signature data object 208 includes a signature value of the compressed archive file and other data related to the manner in which the compressed archive was digitally signed. In one aspect, the signature data object 208 can be formatted in the Cryptographic Message Syntax (CMS). The CMS format includes the signature value, the identity of the digital certificate used to perform the digital signature, and the identity of the cryptographic signature technique used in the digital signature process. CMS is described in the International Engineering Task Force (IETF) specification RFC 5652 and RFC 2630 both of which are incorporated by reference. It should be noted that although CMS is described herein as the cryptographic protocol, the subject matter disclosed herein is not limited to CMS and that other formats and protocols may be used.

The digital signing process utilizes cryptographic keys. In one aspect, the cryptographic keys can include a private/public key pair where the private key is used by the signing device to digitally sign the compressed archive. The verification device uses the public key, in conjunction with the public key algorithm (e.g., RSA, DSA, ECDSA) to verify the authenticity of the signature value for the received compressed archive.

The signature data object 208 may include metadata that identifies the identity of the digital certificate used to digital sign the compressed archive such as a reference to the issuer along with an issuer-specific serial number of the digital certificate. Alternatively, the signature data object 208 may include the digital certificate.

Cryptographic signature techniques frequently employ a cryptographic hashing technique (e.g., message digest algorithm, hash algorithm, etc.) such as MD5 (Message Digest 5), SHA-1 (Secure Hash Algorithm-1), SHA-2 (Secure Hash Algorithm-2) and the like. The signer may utilize any hashing technique which is appropriate for the intended cryptographic signature technique (e.g., RSA, DSA, ECDSA, etc.).

The compressed archive component 204 includes the compressed archive. In one aspect, the compressed archive is formatted as a ZIP archive. The ZIP archive is configured in a particular format that includes one or more local file descriptors for each file 210-218, an archive description header 222, an archive extra data record 224, and a central directory 226. The local file descriptors 210-218 include a file header 210, 216, file data 212, 218, and an optional data descriptor 214, 220. The file data 212, 218 contains the compressed file. The archive description header 222 and the archive extra data record 224 are used to support encryption of the central directory 226.

The central directory 226 contains information about the files in the archive. The central directory 226 includes a central directory file header 228 and an end of central directory record 230. The central directory file header 228 includes an offset of local header for each file which is the offset of where to find the local file header for a respective file from the start of the compressed archive. The end of the central directory record 230 indicates that the container 200 is a ZIP file. The end of the central directory record 230 includes an "offset of start of central directory with respect to the starting disk number" (OSCD) field that is an offset relative to the start of the file containing the compressed archive that indicates the location of the central directory.

Attention now turns to description of the various exemplary methods that utilize the system and device disclosed herein. Operations for the aspects may be further described with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

Figure 3:
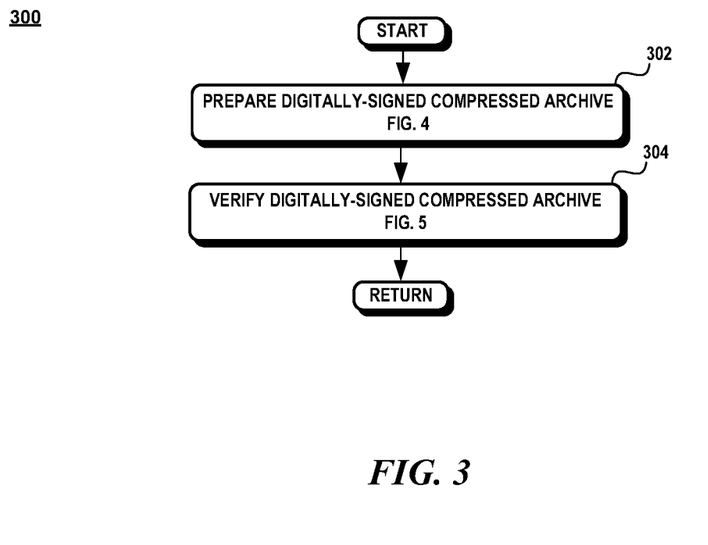
FIG. 3 is a flow diagram illustrating an exemplary method for facilitating the verification of a compressed archive.

FIG. 3 illustrates an exemplary method showing how the system operates in one or more aspects. Initially, the system 300 starts with a signing device preparing a digitally signed compressed archive (block 302). In one aspect, the signing device can be a service that distributes content through digitally-signed compressed archives to one or more users or consumers (block 302). In one aspect, the signing device generates a container containing a signature data object and a compressed ZIP archive (block 302). The container is then distributed to a consumer of the service who verifies the archive prior to utilizing its contents (block 304).

It should be noted that the subject matter disclosed herein is not limited to the aspect of a service distributing content as digitally-signed compressed archives. Other aspects are contemplated that encompass a signer and a recipient that verifies the digitally-signed compressed archive. Attention now turns to a further description of the digital-signing and verification processes.

Figure 4:
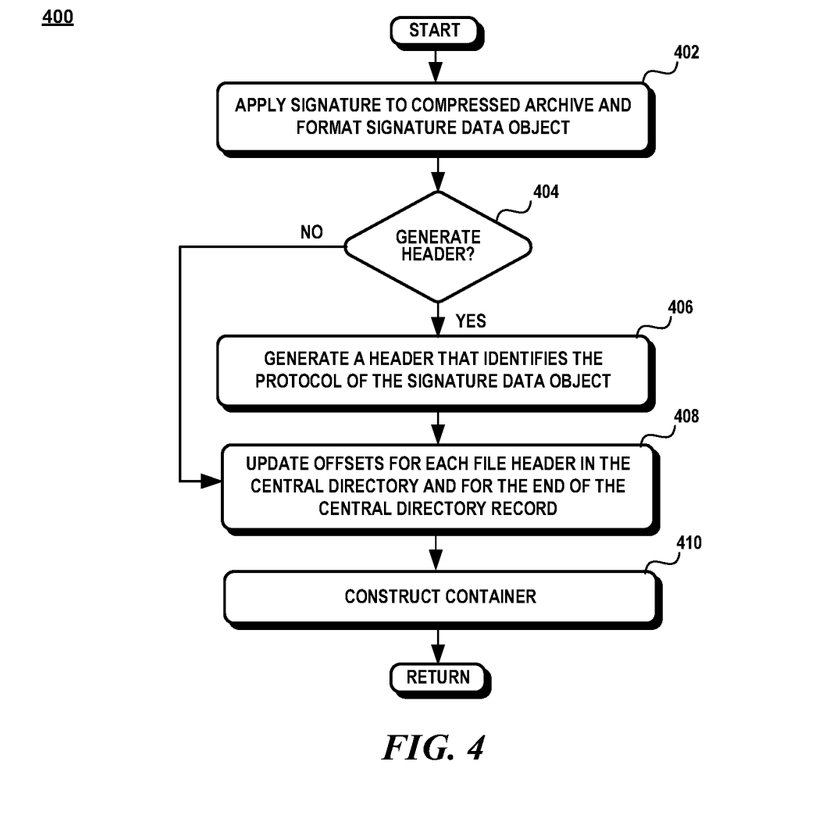
FIG. 4 is a flow diagram illustrating an exemplary method for the cryptographic verification of a digitally-signed compressed archive.

FIG. 4 illustrates an exemplary method of digitally signing a compressed archive. Initially, the signing device and the verification device have obtained keys, such as a private/public key pair. The signing device signs a compressed archive using a particular cryptographic signature technique with the signing device's private key and generates a cryptographic signature representing the compressed archive (block 402). In one aspect, a signature data object is formatted as a CMS message (block 402). The CMS message includes the cryptographic signature, the identification of the digital signature technique used, and optionally, the digital certificate or the identification of the digital certificate associated with the keys used in the digital signing process (block 402). If a header is to be included in the container (block 404—yes), the signing device generates a header that indicates that the compressed archive is signed (block 406).

Next, the offsets in the compressed archive are adjusted to reflect the size of the header and signature data object (block 408). This is done so that the compressed archive component can still be accessed by existing archive reader tools. For instance, the "offset of start of central directory with respect to starting disk number" field of the end of central directory record is increased by the size of the signature data object and/or header (block 408). Additionally, the "offset of local header" field in the central directory file header for each file is also increased by the size of the signature data object and/or header (block 408). If the ZIP archive uses the ZIP64 extensions then the ZIP64 offset values would similarly need to be adjusted.

The container is then generated to include the signature data component and the compressed archive component (block 410). The signature data component includes the header, if any, and the CMS message representation of the signature data object. The compressed archive component includes the compressed archive.

Figure 5:
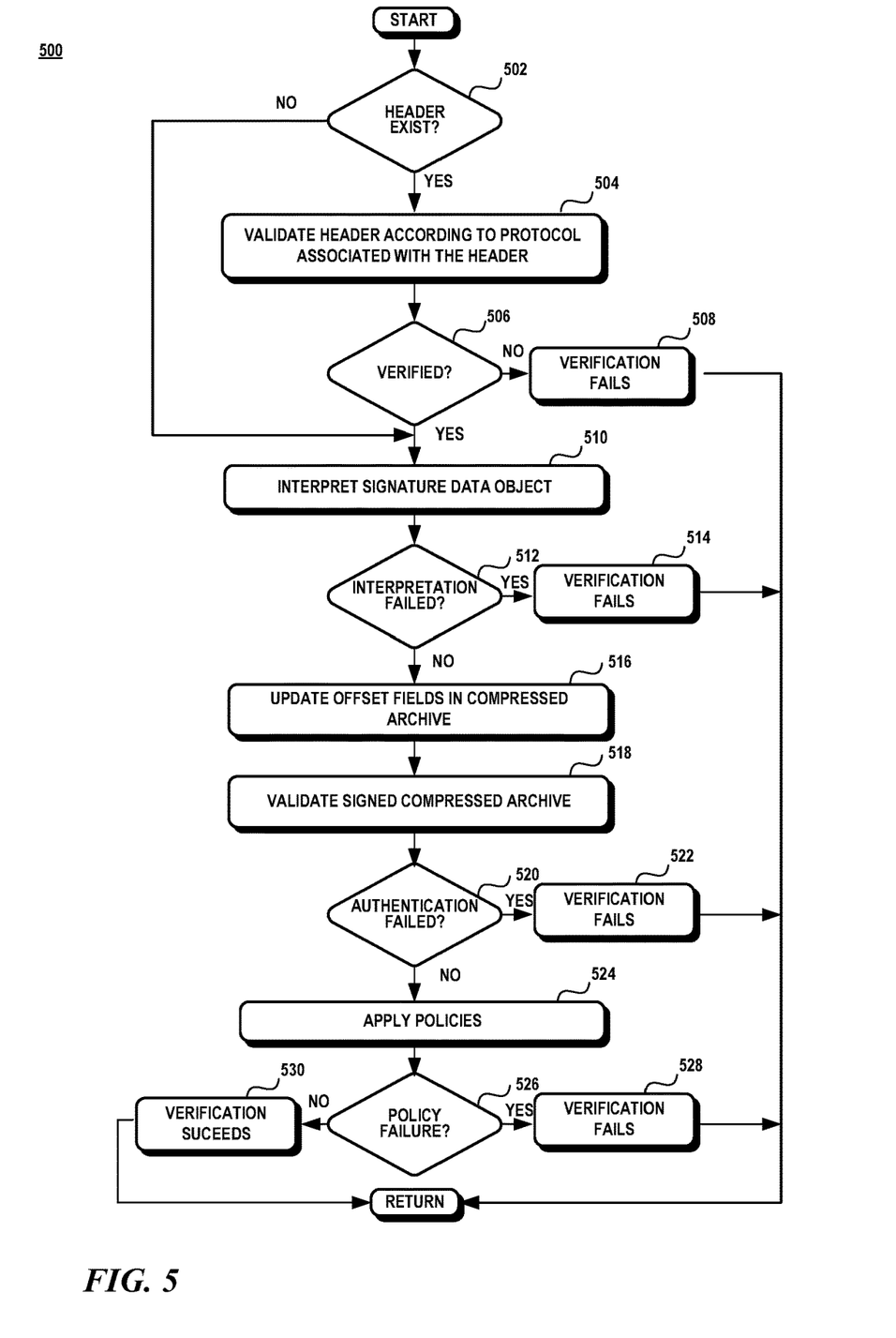
FIG. 5 is a flow diagram illustrating an exemplary method for verifying a digitally-signed compressed archive.

FIG. 5 illustrates an exemplary method of verifying the digitally-signed compressed archive. In one aspect, a verifying device obtains the container and utilizes the verification module to verify the authenticity of the signed compressed archive. If the verification module is aware that the header exists (block 502—yes), then the verification module reads the header and verifies the header according to the protocol which dictates its format (e.g., an application file format specification which indicates a signed file start with a particular sequence of bytes) (block 504). If the header is not verified (block 506—no), then the verification fails (block 508). Otherwise (block 506—yes), then the process continues.

The verification module then reads the signature data object (block 510). In one aspect, the signature data object includes the signature value, the identity of the cryptographic signature technique, and/or metadata that identifies the keys used to generate the signature value (block 510). If interpretation of the signature data object fails (block 512—yes), then the verification fails (block 514). The interpretation of the signature data object may fail due to erroneous data in the signature data object, distorted values in the signature data object, and so forth.

The verification module then updates the offsets in the central directory to reflect their original values (block 516). These offsets are updated so that the signed compressed archive contains the same data as when the compressed archive was digitally signed. The verification module decreases the offset of local header value in the central directory file header for each file by the size of the header, if any, and signature data object and decreases the "offset of start of central directory with respect to the starting disk number" value in the end of central directory record by the size of the header, if any, and signature data object (block 516). If the ZIP archive uses the ZIP64 extensions then the ZIP64 offset values would similarly need to be adjusted.

Next, the verification module validates the signed compressed archive (block 518). The verification module uses the verification algorithm of the cryptographic signature technique. The specific cryptographic signature technique may have been communicated in the signature data object, or may have been dictated by a specific application or protocol. If the verification algorithm indicates that the signature is valid, then the compressed archive is authenticated (block 520—no). Otherwise, if the signature value computed by the verification module does not match the signature value in the signature data object, then the compressed archive is not verified (block 522).

In one aspect, policies are applied in addition to the cryptographic verification (block 524). The policies are set by the verification device and/or users associated with the verification device and dictate additional conditions that need to be met in order for the verification to succeed. For example, a policy can require that the CMS message indicate that a RSA signature was used to generate the signature value and that the key size used for the digital signature must exceed 2048-bits in length. Another policy may require that the signer is trusted according to a dictated scheme. If the policies are not met (block 526—yes), then the verification fails (block 528). Otherwise, if the policies are met (block 526—no), then the verification succeeds (block 530).

Technical Effect

Aspects of the subject matter disclosed herein pertain to the technical problem of verifying a compressed archive that allows existing software archive tools and utilities to access the compressed archive in their normal course of operation and performs the verification without decompressing the compressed archive. The technical feature associated with addressing this problem involves the generation of a container that includes a signature component that includes a cryptographic signature of the compressed archive and a compressed archive component that includes the compressed archive. The structure of the container where these components are independent of each other allows existing archive utilities to operate as intended. The inclusion of the cryptographic signature in the same container as the compressed archive protects integrity issues associated with copying the compressed archive and cryptographic signature to a different storage location. The cryptographic signature being external to the compressed archive, but within the same container, protects against subsequent tampering of the compressed archive.

Exemplary Operating Environment

Figure 6:
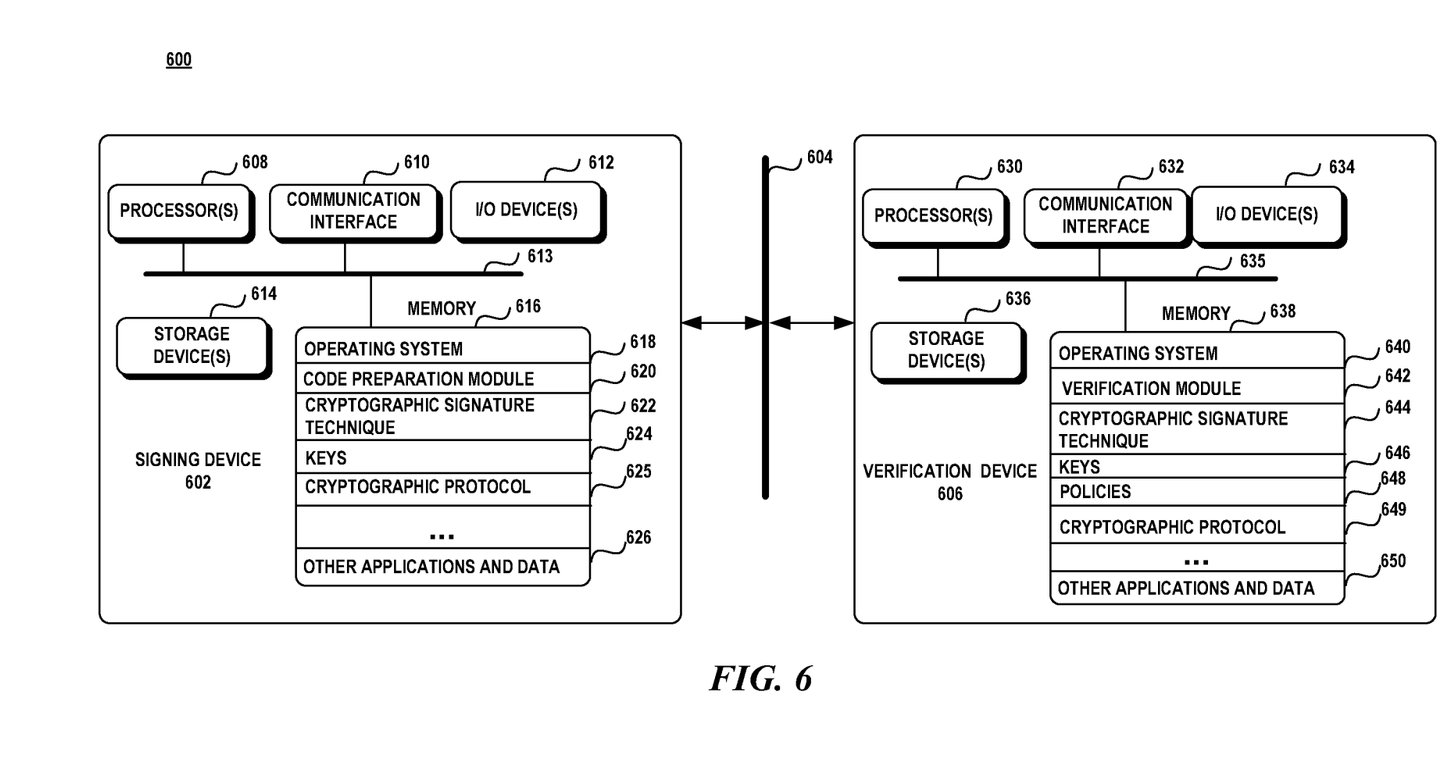
FIG. 6 is an exemplary operating environment.

Attention now turns to a discussion of an exemplary operating embodiment. In FIG. 6, there is shown an exemplary operating environment of a system 600 implementing the technology described herein. The system 600 includes a signing device 602, a communications framework 604, and a verification device 606.

The signing device 602 and the verification device 606 may be, without limitation, any type of electronic device, such as without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof.

The communications framework 604 may be configured as an ad hoc network, an intranet, an extranet, a virtual private network (VPN), a local area network (LAN), a wireless LAN (WLAN), a wide area network (WAN), a wireless WAN (WWAN), a metropolitan network (MAN), the Internet, a portions of the Public Switched Telephone Network (PSTN), plain old telephone service (POTS) network, a wireless network, a WiFi® network, or any other type of network or combination of networks.

The communications framework 604 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

In one aspect, the signing device 602 may include at least one processor 608, such as a central processing unit (CPU), hardware microcontroller (e.g., System On A Chip (SOC)), and/or multi-processors, communicatively coupled to a memory 616 via a bus 613. The signing device 602 may include a communications interface 610, input/output (I/O) devices 612, and storage devices 614.

The communications interface 610 includes circuitry for coupling the mobile computing device to one or more networks that are configured to use, without limitation, protocols and technologies that implement any portion of the OSI model, GSM, CDMA, time division multiple access (TDMA), UDP, TCP/IP, SMS, MMS, GPRS, WAP, UWB, WiMax, SIP/RTP, EDGE, WCDMA, LTE, UMTS, OFDM, or any of a variety of other wireless communication protocols. The communications interface 610 can be a transceiver or network interface card.

The storage devices 614 may be computer-readable medium that does not contain propagating signals, such as modulated data signals transmitted through a carrier wave. Examples of a storage devices 614 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 614 in the signing device 604. The input/output (I/O) devices 612 may include a keyboard, mouse, pen, voice input device, touch input device, display, speakers, printers, etc., and any combination thereof.

The memory 616 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. The memory 146 may also include one or more external storage devices or remotely located storage devices that do not pertain to propagated signals, such as modulated data signals transmitted through a carrier wave. The memory 616 may include an operating system 618, a code preparation module 620, a cryptographic signature technique 622, one or more cryptographic keys 624, a cryptographic protocol 625, and other applications and data 626.

In one aspect, the verification device 606 may include at least one processor 630, such as a central processing unit (CPU), hardware microcontroller (e.g., System On A Chip (SOC)), and/or multi-processors, communicatively coupled to a memory 638 via a bus 635. The verification device 606 may include a communications interface 632, input/output (I/O) devices 634, and storage devices 636.

The communications interface 632 includes circuitry for coupling the mobile computing device to one or more networks that are configured to use, without limitation, protocols and technologies that implement any portion of the OSI model, GSM, CDMA, time division multiple access (TDMA), UDP, TCP/IP, SMS, MMS, GPRS, WAP, UWB, WiMax, SIP/RTP, EDGE, WCDMA, LTE, UMTS, OFDM, or any of a variety of other wireless communication protocols. The communications interface 632 can be a transceiver or network interface card.

The storage devices 636 may be computer-readable medium that does not contain propagating signals, such as modulated data signals transmitted through a carrier wave. Examples of a storage devices 636 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 636 in the verification device 606. The input/output (I/O) devices 634 may include a keyboard, mouse, pen, voice input device, touch input device, display, speakers, printers, etc., and any combination thereof.

The memory 638 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. The memory 638 may also include one or more external storage devices or remotely located storage devices that do not pertain to propagated signals, such as modulated data signals transmitted through a carrier wave. The memory 638 may include an operating system 640, a verification module 642, a cryptographic signature technique 644, one or more cryptographic keys 646, a cryptographic protocol 649, one or more policies 648, and other applications and data 650.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It should be noted that various modifications can be made to the technology described herein. The signature data object formatted in the CMS can be binary encoded as described in IETF RFC 5652. Other cryptographic protection mechanisms can be used instead of CMS such as, without limitation, W3C XML Signature Syntax and Processing (xmldsig), the raw output bytes of a digital signature (e.g. RSA, DSA, ECDSA) or Hash-based Message Authentication Code (HMAC) algorithm using a pre-established key, and the like. Although the subject matter disclosed herein is described with respect to a ZIP file, other compressed file formats may be used such as without limitation, the Unix tar file format and the like.

The digitally-signed compressed archive does not have to be distributed over a network. The digitally-signed compressed archive can be stored on a physical storage medium, such as CD, DVD, optical drive, etc., and distributed to another device that verifies the archive.

What is claimed:

1. A system, comprising:
   at least one processor and a memory;
   a verification module having instructions that when executed on the at least one processor performs actions that:
   receives a container including a signature component and a compressed archive component, the compressed archive component including a compressed archive, the signature component including a signature data object having a digital signature of the compressed archive, wherein the signature component is not compressed and outside of the compressed archive, the signature component including a header, the header including a first datum indicating whether or not the compressed archived component is digitally signed and a second datum identifying a cryptographic signature technique of the digital signature; and
   verifies authenticity of the compressed archive by performing cryptographic verification on the compressed archive without decompressing the compressed archive and with the digital signature of the signature data object.

2. The system of claim 1, wherein the signature data object includes an identifier of a digital certificate used in generation of the digital signature in the signature data object.

3. The system of claim 1, wherein the verification module applies at least one policy to the verified compressed archive to determine whether or not the digital signature is genuine.

4. The system of claim 1 wherein the signature data object is formatted as an XML digital signature.

5. The system of claim 1, wherein the signature data object is formatted as a Cryptographic Message Syntax message.

6. The system of claim 1, wherein the verification module determines that the compressed archive is not authentic when the signature data object is not interpreted in accordance with a format associated with the signature data object.

7. A method, comprising:
   receiving a compressed archive;
   producing a digital signature of the compressed archive;
   formatting a signature component including a signature data object, the signature data object including the digital signature, wherein the signature component is not compressed; and
   generating a container including the signature component and the compressed archive, wherein the signature component and the compressed archive are independent components, wherein the signature component is outside of the compressed archive, wherein the signature component includes a header, the header including a first datum indicating whether or not the compressed archive is digitally signed and a second datum specifying a cryptographic signature technique of the digital signature, wherein the compressed archive is not decompressed when the compressed archive is authenticated with the digital signature when the compressed archive is digitally signed.

8. The method of claim 7, wherein the signature data object is formatted as Cryptographic Message Syntax message.

9. The method of claim 7, wherein the compressed archive is formatted as a ZIP file.

10. The method of claim 7, wherein the signature data object includes metadata used to identify a digital certificate associated with a cryptographic key used to digitally sign the compressed archive.

11. The method of claim 7, wherein the signature data object is formatted as an XML digital signature, CMS Authenticated-Data, or the direct output of a Hash-based Message Authentication Code algorithm.

12. A device, comprising:
at least one processor and a memory;
wherein the at least one processor is configured to:
obtain a container including a compressed archive and a signature component, the signature component including a digital signature representing the compressed archive, the digital signature separate from the compressed archive, wherein the signature component is not compressed, the signature component including a header, the header including a first datum indicating whether or not the compressed archive is digitally signed and a second datum indicating a cryptographic signature technique of the digital signature; and
determine authenticity of the compressed archive by applying a signature verification technique based on the compressed archive and the digital signature without decompressing the compressed archive.

13. The device of claim 12, wherein the digital signature is formatted in Cryptographic Message Syntax or a Message Authentication Code.

14. The device of claim 12, wherein the compressed archive is formatted as a ZIP file.

15. The device of claim 12, wherein the at least one processor is further configured to: apply at least one policy to the compressed archive to determine whether the compressed archive is authenticated.

16. The device of claim 12, wherein the signature verification technique is based on a cryptographic signature technique associated with the signature component.

* * * * *